J. D. HARRISON.
Seeding Machine.
No. 105,200.
Patented July 12, 1870.
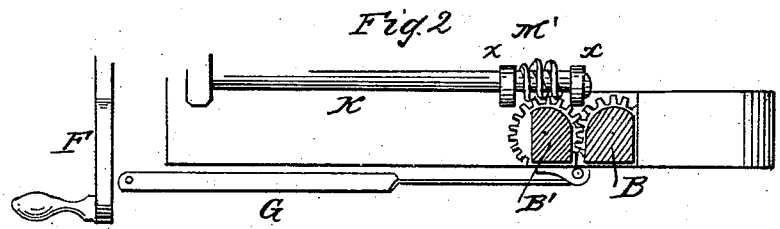
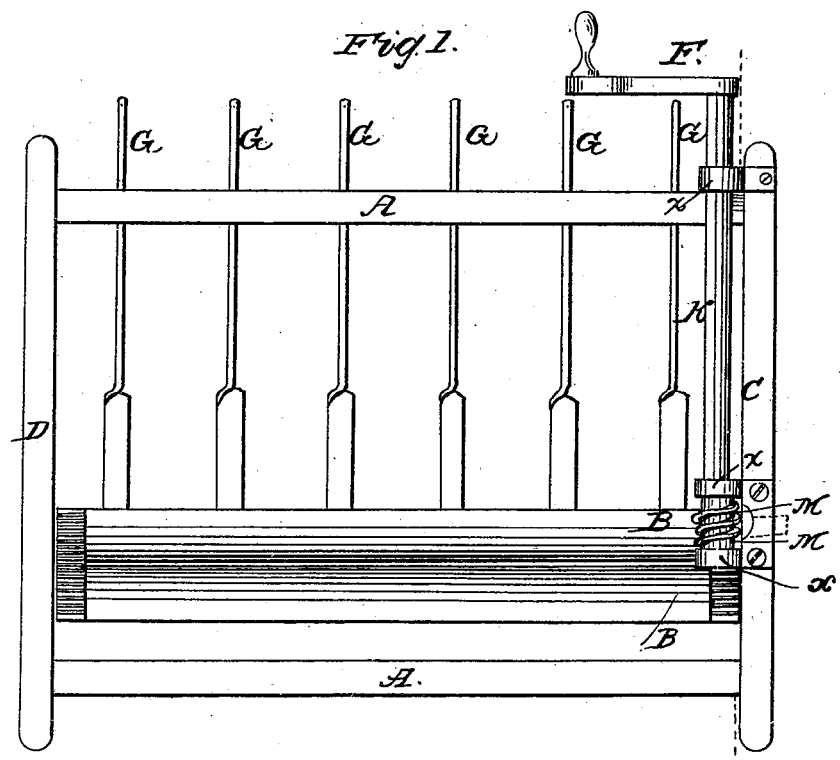

UNITED STATES PATENT OFFICE.

JOHN D. HARRISON, OF MIDDLETOWN, OHIO.

IMPROVEMENT IN SEEDING-MACHINES.

Specification forming part of Letters Patent No. 105,200, dated July 12, 1870.

*To all whom it may concern:*

Be it known that I, JOHN D. HARRISON, of Middletown, in Butler county, Ohio, have invented a new and useful Improvement in Seeding-Machines; and I do hereby declare that the following is a full and exact description thereof, reference being had to the accompanying drawing, and to the letters of reference marked thereon.

Figure 1 represents a plan or top view of the frame of a seeding-machine with my improved adjusting mechanism attached thereto. Fig. 2 represents a transverse vertical section of the same, taken at the line $m\ m$ of Fig. 1.

My present invention relates to a certain improvement upon my seeding-machine patented August 24, 1869; and consists in the combination of a worm-gear shaft with the adjusting-bars to which the drag-bars are connected.

A D C denote the frame of a seeding-machine, in which the adjusting-bars B B' are journaled. The ends of the bars B B' are provided with sockets having segmental gearing, as seen in the drawing.

The drag-bars G (to which hoes are attached in a complete machine) are hinged alternately to each of the bars B B'. These bars, to which the drag-bars G are hinged, are of the form represented in Fig. 2. Their journals occupy a proper relation to each other to bring the segmental gearing into mesh at each side of the machine.

One of the journals M extends out beyond the frame A D C, for the purpose of attaching a lever, if desired.

Above the frame of the machine a shaft, K, provided with the worm M', is supported in suitable metal loops $x\ x$, made fast by screws to the frame-piece C.

The shaft K is provided with a crank, F, at its rear end, and the worm M' works in the cogs of the gear upon the end of bar B', as seen in Fig. 2 of the drawing.

The drag-bars G, being hinged alternately to the bars B B', may be readily adjusted by means of the gearing connected with them, so as to occupy a single or double rank, as was fully described in my patent above referred to. The adjustment will be conveniently effected by means of the worm-gear M' and its shaft K and crank F.

The use of the worm-gear will serve as a stop to retain the bars B B' in any position into which they are be adjusted.

The metal socket upon the end of shaft B', into the gearing of which the worm works, is provided with an additional number of cogs for the purpose of admitting the worm to act, so as to perfectly adjust the bars B B', and consequently adjust the drag-bars G and the hoes to be attached thereto, as before specified.

Having fully described my improvement in seeding-machines, what I claim, and desire to secure by Letters Patent, is—

The geared bars B B', journaled in frame A D C, in combination with the worm M' and hinged drag-bars G, arranged and operating substantially as and for the purpose described.

In testimony whereof I have this 12th day of May, 1870, subscribed my name.

JOHN D. HARRISON.

Witnesses:
  H. P. K. PECK,
  A. A. WITNER.